(12) United States Patent
James et al.

(10) Patent No.: US 10,494,951 B2
(45) Date of Patent: Dec. 3, 2019

(54) CIRCULATING LUBRICANT THROUGH A TURBINE ENGINE COMPONENT WITH PARALLEL PUMPS

(71) Applicant: United Technologies Corporation, Hartford, CT (US)

(72) Inventors: Denman H. James, Windsor, CT (US); Reade W. James, West Hartford, CT (US)

(73) Assignee: United Technologies Corporation, Farmington, CT (US)

( * ) Notice: Subject to any disclaimer, the term of this patent is extended or adjusted under 35 U.S.C. 154(b) by 481 days.

(21) Appl. No.: 14/775,921

(22) PCT Filed: Mar. 14, 2014

(86) PCT No.: PCT/US2014/027238
§ 371 (c)(1),
(2) Date: Sep. 14, 2015

(87) PCT Pub. No.: WO2014/152347
PCT Pub. Date: Sep. 25, 2014

(65) Prior Publication Data
US 2016/0032773 A1    Feb. 4, 2016

Related U.S. Application Data

(60) Provisional application No. 61/787,273, filed on Mar. 15, 2013.

(51) Int. Cl.
*F01D 25/20* (2006.01)
*F01D 5/02* (2006.01)
(Continued)

(52) U.S. Cl.
CPC .............. *F01D 25/20* (2013.01); *F01D 5/02* (2013.01); *F01D 15/12* (2013.01); *F01D 25/16* (2013.01);
(Continued)

(58) Field of Classification Search
CPC . F01D 25/20; F01D 5/02; F01D 15/12; F01D 25/16; F02C 7/06; F05D 2260/98;
(Continued)

(56) References Cited

U.S. PATENT DOCUMENTS

| | | | | |
|---|---|---|---|---|
| 2,711,071 A | * | 6/1955 | Frankel | F01D 25/20 |
| | | | | 184/6.3 |
| 3,091,382 A | * | 5/1963 | Shelley | F02C 7/04 |
| | | | | 415/122.1 |

(Continued)

FOREIGN PATENT DOCUMENTS

EP         224120         9/2010

OTHER PUBLICATIONS

EP search report for EP14767528.4 dated Apr. 6, 2016.
Office action for EP14787528.4 dated Feb. 8, 2019.

*Primary Examiner* — Eldon T Brockman
(74) *Attorney, Agent, or Firm* — O'Shea Getz P.C.

(57) ABSTRACT

A system for a turbine engine includes a turbine engine component, a lubricant collection device and a plurality of lubricant circuits. The lubricant collection device is fluidly coupled with the turbine engine component. The lubricant circuits are fluidly coupled between the lubricant collection device and the turbine engine component. The lubricant circuits include a first circuit and a second circuit configured in parallel with the first circuit. Each of the lubricant circuits includes a lubricant pump. The first and the second circuits (Continued)

receive lubricant from the lubricant collection device, and direct the received lubricant to the turbine engine component.

15 Claims, 4 Drawing Sheets

(51) Int. Cl.
*F01D 15/12* (2006.01)
*F01D 25/16* (2006.01)
*F02C 7/06* (2006.01)

(52) U.S. Cl.
CPC ............ *F02C 7/06* (2013.01); *F05D 2220/30* (2013.01); *F05D 2240/24* (2013.01); *F05D 2240/50* (2013.01); *F05D 2260/98* (2013.01)

(58) Field of Classification Search
CPC ............ F05D 2220/30; F05D 2240/24; F05D 2240/50
See application file for complete search history.

(56) References Cited

U.S. PATENT DOCUMENTS

| | | | | |
|---|---|---|---|---|
| 4,153,141 A * | 5/1979 | Methlie | ............... | F01D 25/20 184/6.11 |
| 4,309,870 A * | 1/1982 | Guest | ............... | F01D 25/20 184/6.11 |
| 4,424,665 A * | 1/1984 | Guest | ............... | F01D 25/20 184/6.11 |
| 4,888,947 A * | 12/1989 | Thompson | ............. | F01D 25/20 184/6.11 |
| 4,891,934 A * | 1/1990 | Huelster | ............... | F01D 25/20 184/6.11 |
| 6,363,707 B2 * | 4/2002 | Junquera | ............... | F01D 25/18 60/39.08 |
| 6,886,324 B1 * | 5/2005 | Handshuh | ............... | F01D 25/20 60/39.08 |
| 7,426,834 B2 * | 9/2008 | Granitz | ............... | F01D 25/18 184/6.11 |
| 8,051,869 B2 * | 11/2011 | Parnin | ............... | F16K 17/36 137/1 |
| 8,230,974 B2 * | 7/2012 | Parnin | ............... | F01D 25/18 184/6.11 |
| 8,307,626 B2 * | 11/2012 | Sheridan | ............... | F01D 25/20 184/26 |
| 8,381,878 B2 * | 2/2013 | DiBenedetto | ........... | F01D 25/18 184/6.11 |
| 8,607,576 B1 * | 12/2013 | Christians | ............... | F02C 7/36 60/792 |
| 8,834,099 B1 * | 9/2014 | Topol | ............... | F01D 5/02 415/119 |
| 2005/0166570 A1 * | 8/2005 | Granitz | ............... | F01D 25/18 60/39.08 |
| 2008/0093171 A1 | 4/2008 | Portlock | | |
| 2010/0065374 A1 | 3/2010 | Szolomayer et al. | | |
| 2010/0212281 A1 * | 8/2010 | Sheridan | ............... | F01D 25/20 60/39.08 |
| 2010/0294597 A1 * | 11/2010 | Parnin | ............... | F01D 25/18 184/6.1 |
| 2011/0108360 A1 | 5/2011 | Dibenedetto | | |
| 2011/0155508 A1 | 6/2011 | Glahn et al. | | |
| 2012/0103728 A1 | 5/2012 | Portlock et al. | | |
| 2015/0361811 A1 * | 12/2015 | Schwarz | ............... | F01D 25/18 60/39.08 |
| 2015/0369082 A1 * | 12/2015 | Schwarz | ............... | F01D 25/18 415/177 |

\* cited by examiner

CIRCULATING LUBRICANT THROUGH A TURBINE ENGINE COMPONENT WITH PARALLEL PUMPS

This application claims priority to PCT Patent Appln. No. PCT/US14/27238 filed Mar. 14, 2014, which claims priority to U.S. Patent Appln. No. 61/787,273 filed Mar. 15, 2013, which is are hereby incorporated herein by reference in their entireties.

BACKGROUND OF THE INVENTION

1. Technical Field

This disclosure relates generally to a turbine engine and, more particularly, to a system for circulating lubricant through a turbine engine component.

2. Background Information

A typical geared turbofan engine includes a fan section, a compressor section, a combustor section and a turbine section. A rotor of the fan section is connected to and driven by a rotor of the turbine section through a shaft and a gear train. The turbofan engine also includes a lubrication system that circulates lubrication oil through the gear train to lubricate and cool components of the gear train.

A lubrication system for a mechanical system with components that require a robust oil supply at all times may include a primary circuit and an auxiliary circuit. The primary circuit includes a scavenge pump, an oil reservoir, a supply pump as well as various oil conditioning devices. The auxiliary circuit includes an auxiliary pump. The lubrication system also includes a diverter valve, which selectively fluidly couples the auxiliary pump to the oil reservoir and the gear train. For example, when the primary circuit provides the lubrication oil to the gear train, the diverter valve directs the lubrication oil pumped by the auxiliary pump to the oil reservoir. In contrast, when the primary circuit clogs or otherwise malfunctions, the diverter valve directs the lubrication oil pumped by the auxiliary pump to the gear train. Such a diverter valve, however, may increase the overall cost and/or weight of the lubrication system. In addition, the diverter valve introduces another component into the lubrication system that requires maintenance and that may potentially fail.

There is a need in the art for an improved lubrication system for a turbine engine.

SUMMARY OF THE DISCLOSURE

According to an aspect of the invention, a system is provided for a turbine engine. The system includes a turbine engine component, a lubricant collection device and plurality of lubricant circuits, which include a first circuit and a second circuit configured in parallel with the first circuit. The lubricant collection device is fluidly coupled with the turbine engine component. The lubricant circuits are fluidly coupled between the lubricant collection device and the turbine engine component, and each includes a lubricant pump. The first and the second circuits receive lubricant from the lubricant collection device and direct the received lubricant to the turbine engine component.

According to another aspect of the invention, another system is provided for a turbine engine. The system includes a lubricant manifold, a turbine engine bearing and a plurality of lubricant circuits, which include a first circuit and a second circuit configured in parallel with the first circuit. The turbine engine bearing receives lubricant from the lubricant manifold. The lubricant collection device receives the lubricant from the bearing. The lubricant circuits receive the lubricant from the lubricant collection device and respectively direct the lubricant to the lubricant manifold. Each of the lubricant circuits includes a lubricant pump.

According to still another aspect of the invention, another system is provided for a turbine engine. The system includes a turbine engine component, a lubricant collection device and plurality of lubricant pumps, which include a first pump and a second pump configured in parallel with the first pump. The lubricant collection device is fluidly coupled with the turbine engine component. The lubricant pumps are fluidly coupled between the lubricant collection device and the turbine engine component. The first and the second pumps receive lubricant from the lubricant collection device and concurrently direct the received lubricant to the turbine engine component.

The first and the second circuits may each extend to the turbine engine component.

The turbine engine component may include a bearing and a manifold. The manifold may respectively receive the lubricant from the first and the second circuits. The manifold may direct the received lubricant to the bearing.

The first circuit may direct the received lubricant to the turbine engine component at a first flow rate. The second circuit may direct the received lubricant to the turbine engine component at a second flow rate that is different (e.g., greater or less) than the first flow rate. Alternatively, the second flow rate may be substantially equal to the first flow rate.

One or both of the lubricant circuits may include a heat exchanger. One or both of the lubricant circuits may also or alternatively include a lubricant filter. One or both of the lubricant circuits may also or alternatively include a lubricant reservoir. One or both of the lubricant circuits may also or alternatively include a second lubricant pump.

The system may include an engine compartment within which the turbine engine component is located. One of the lubricant circuits may include a sump for the engine compartment. The turbine engine component may be configured as or include a gear train. The lubricant collection device may be configured as or include a gutter fluidly coupled between the gear train and the sump. The gutter may at least partially circumscribe and collect the lubricant from the gear train.

The system may include an engine compartment within which the turbine engine component is located. The lubricant collection device may be configured as or include a sump for the engine compartment.

The turbine engine component may be configured as or include a bearing. The bearing may be configured in a gear train. Alternatively, the bearing may be configured to support a turbine engine shaft.

The system may include a plurality of turbine engine rotors arranged along an axis, which rotors include a first rotor and a second rotor. Each of the engine rotors may include a plurality of rotor blades arranged around and connected to a rotor disk. The turbine engine component may be configured as or include a gear train. The first rotor may be connected to and driven by the second rotor through the gear train. The first rotor may be configured as or include a fan rotor. The second rotor may be configured as or include a turbine rotor.

The system may include a lubricant first circuit and a lubricant second circuit. The first circuit may be fluidly coupled with and extend to the turbine engine component. The first circuit may include the first pump. The second circuit may be fluidly coupled with and extend to the turbine engine component. The second circuit may be configured in parallel with the first circuit and include the second pump.

The system may include an engine compartment within which the turbine engine component is located. The system may also include a sump for the engine compartment that is fluidly coupled between the lubricant collection device and the first pump. The turbine engine component may be configured as or include a gear train. The lubricant collection device may be configured as or include a gutter that is fluidly coupled between the gear train and the sump. The gutter may at least partially circumscribe and collect the lubricant from the gear train.

The system may include an engine compartment within which the turbine engine component is located. The lubricant collection device may be configured as or include a sump for the engine compartment.

The foregoing features and the operation of the invention will become more apparent in light of the following description and the accompanying drawings.

DETAILED DESCRIPTION OF THE INVENTION

Figure 1:
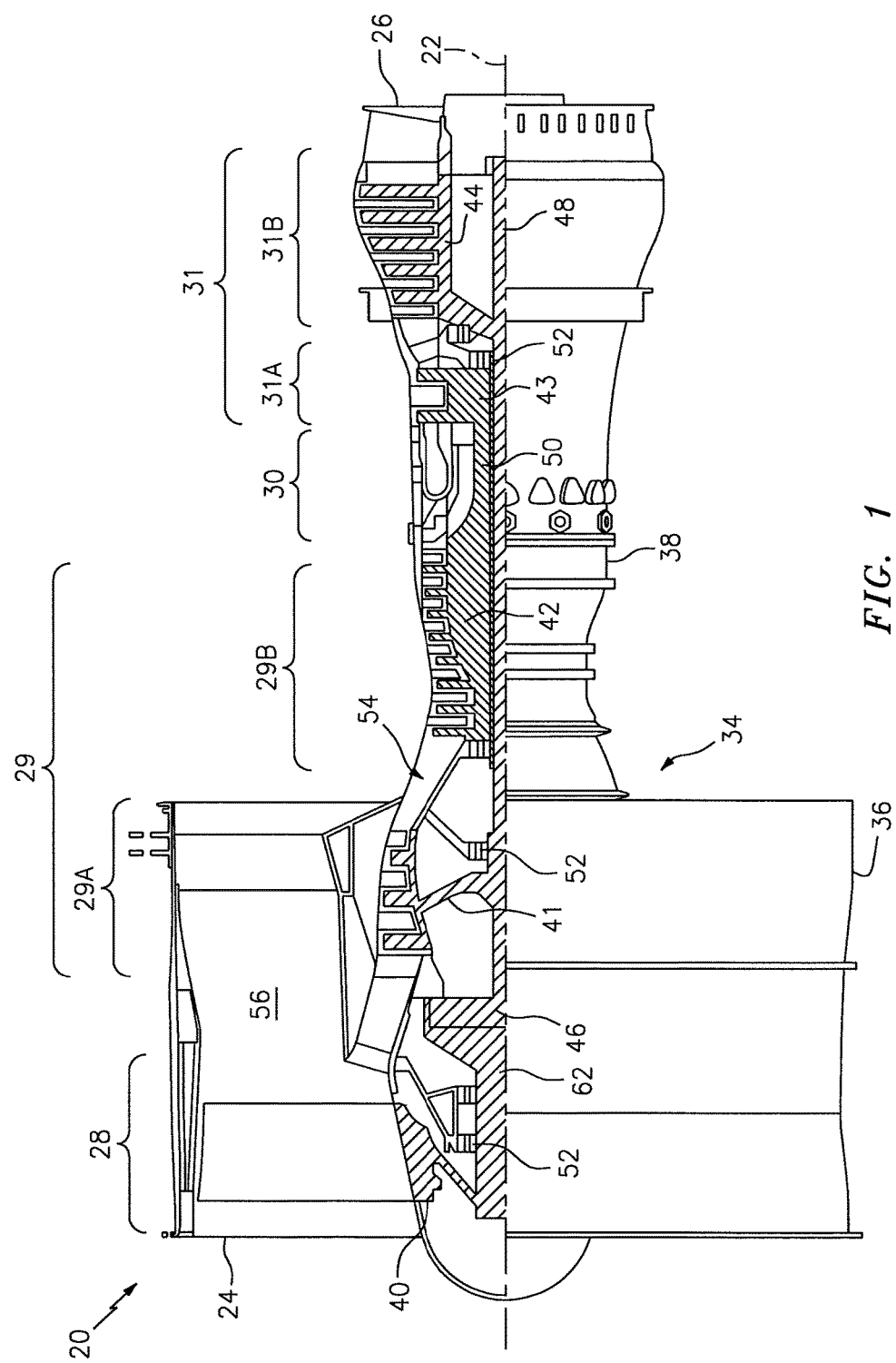
FIG. 1 is a side cutaway illustration of a geared turbine engine.

FIG. 1 is a side cutaway illustration of a geared turbine engine 20 that extends along an axis 22 between an upstream airflow inlet 24 and a downstream airflow exhaust 26. The engine 20 includes a fan section 28, a compressor section 29, a combustor section 30 and a turbine section 31. The compressor section 29 includes a low pressure compressor (LPC) section 29A and a high pressure compressor (HPC) section 29B. The turbine section 31 includes a high pressure turbine (HPT) section 31A and a low pressure turbine (LPT) section 31B. The engine sections 28-31 are arranged sequentially along the axis 22 within an engine housing 34, which includes a first engine case 36 (e.g., a fan nacelle) and a second engine case 38 (e.g., a core nacelle).

Each of the engine sections 28, 29A, 29B, 31A and 31B includes a respective rotor 40-44. Each of the rotors 40-44 includes a plurality of rotor blades arranged circumferentially around and connected to (e.g., formed integral with or mechanically fastened, welded, brazed, adhered or otherwise attached to) one or more respective rotor disks. The fan rotor 40 is connected to a gear train 46; e.g., an epicyclic gear train. The gear train 46 and the LPC rotor 41 are connected to and driven by the LPT rotor 44 through a low speed shaft 48. The HPC rotor 42 is connected to and driven by the HPT rotor 43 through a high speed shaft 50. The low and high speed shafts 48 and 50 are rotatably supported by a plurality of bearings 52. Each of the bearings 52 may be connected to the second engine case 38 by at least one stator such as, for example, an annular support strut.

Air enters the engine 20 through the airflow inlet 24, and is directed through the fan section 28 and into an annular core gas path 54 and an annular bypass gas path 56. The air within the core gas path 54 may be referred to as "core air". The air within the bypass gas path 56 may be referred to as "bypass air" or "cooling air". The core air is directed through the engine sections 29-31 and exits the engine 20 through the airflow exhaust 26. Within the combustor section 30, fuel is injected into and mixed with the core air and ignited to provide forward engine thrust. The bypass air is directed through the bypass gas path 56 and out of the engine 20 to provide additional forward engine thrust or reverse thrust via a thrust reverser. The bypass air may also be utilized to cool various turbine engine components within one or more of the engine sections 29-31.

Figure 2:
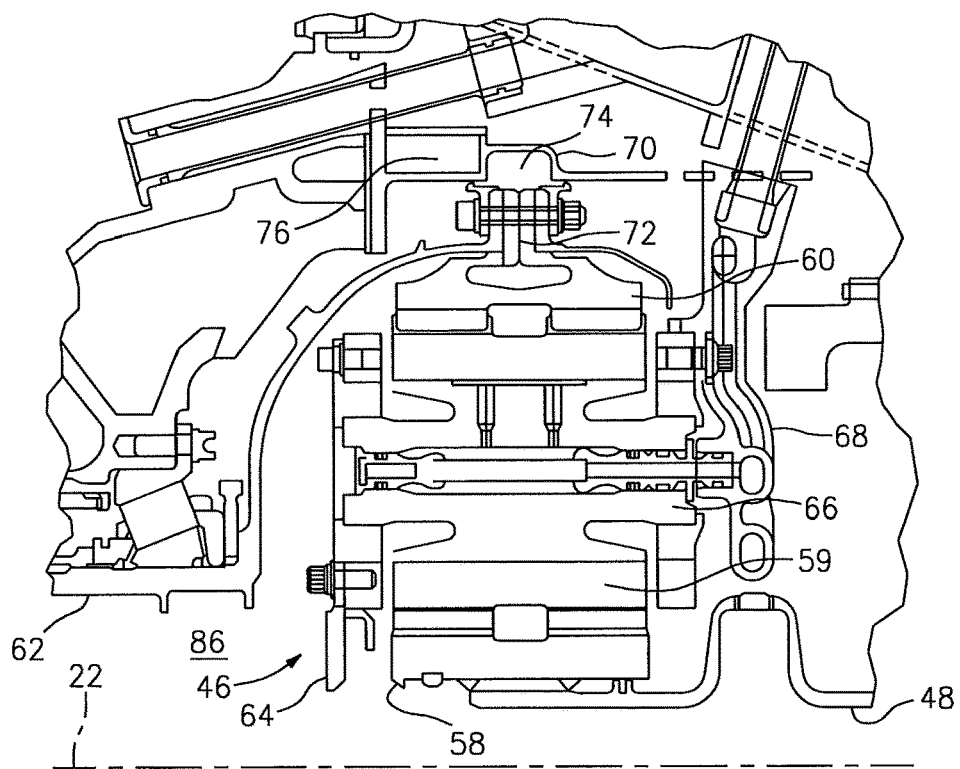
FIG. 2 is a partial sectional illustration of a turbine engine system for the engine of FIG. 1.
Figure 3:
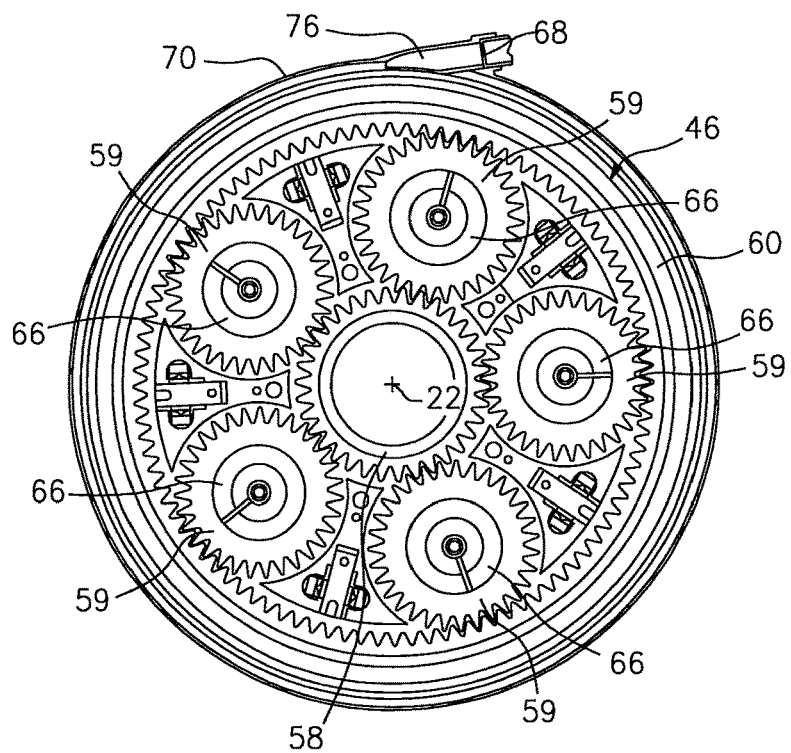
FIG. 3 is an illustration of an end of a gear train and a gutter included in the turbine engine system of FIG. 2.

Referring to FIGS. 2 and 3, the gear train 46 includes a plurality of gears 58-60 arranged in a star gear train configuration. Alternatively, the gears 58-60 may be arranged in a planetary gear train configuration, or any other type of gear train configuration. The gears include a sun gear 58, one or more star gears 59, and a ring gear 60.

The sun gear 58 is rotatable about the axis 22. The sun gear 58 is connected to the low speed shaft 48 through a joint such as a spline joint. The star gears 59 are arranged circumferentially around the axis 22. The star gears 59 are radially meshed between the sun gear 58 and the ring gear 60. Each of the star gears 59 is rotatable about a respective axis. Each of the star gears 59 is rotatably connected to a stator gear carrier 64 through a bearing 66. The bearing 66 may be a journal bearing, or alternatively any other type of bearing such as a roller element bearing, etc. The gear carrier 64 is connected to the second engine case 38 (see FIG. 1) through a support strut and/or a flexible support. The ring gear 60 is rotatable about the axis 22. The ring gear 60 is connected to a shaft 62 through a joint such as a bolted flange joint, which shaft 62 is connected to the fan rotor 40 (see FIG. 1).

During engine 20 operation, a lubricant manifold 68 provides lubricant (e.g., lubrication oil) to the gear train 46. The lubricant may lubricate meshing surfaces of the gears 58-60 and/or engaging surfaces of the gears 59 and the bearings 66. The lubricant may also or alternatively remove heat energy from the gears 58-60 and/or the bearings 66. The lubricant is collected from the gear train 46 with a lubricant collection gutter 70, which at least partially circumscribes the gear train 46. Centrifugal force induced by rotation of the ring gear 60, for example, may cause at least a portion of the lubricant within the gear train 46 to flow through passages 72 in the ring gear 60 and radially into a channel 74 of the gutter 70. A conduit 76 fluidly coupled with the channel 74 may subsequently direct the lubricant collected within the channel 74 to an engine compartment sump 78 (see FIG. 4). The conduit 76 may also or alternatively direct the lubricant collected within the channel 74 to an auxiliary oil reservoir (not shown) for the gear train 46 and/or to any other lubrication system component. The lubricant may subsequently be re-circulated through the gear train 46 for further gear train component lubrication and/or cooling as described below in further detail.

Figure 4:
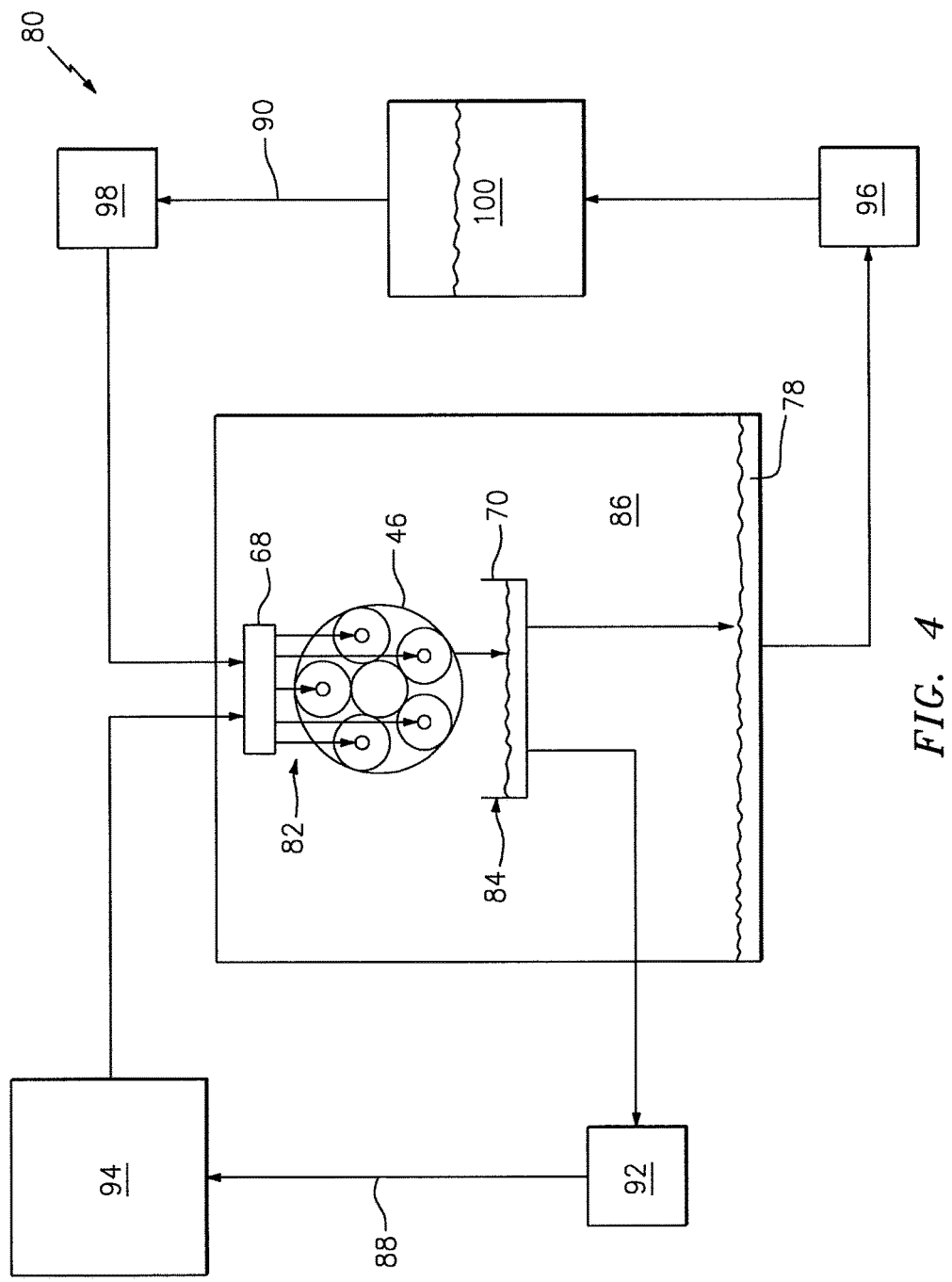
FIG. 4 is a schematic illustration of a lubrication system for the engine of FIG. 1.

FIG. 4 is a schematic illustration of a lubrication system 80 included in the engine 20 of FIG. 1. The lubrication system 80 includes a turbine engine component 82 and a lubricant collection device 84, which are located within an engine compartment 86 (see also FIG. 2) of the engine 20. The lubrication system 80 also includes a plurality of lubricant circuits, which include a lubricant first (e.g., auxiliary) circuit 88 and a lubricant second (e.g., primary) circuit 90.

The turbine engine component 82 includes the lubricant manifold 68 and the gear train 46. The turbine engine component 82, however, may also or alternatively include one or more of the bearings 52 that support the low speed shaft 48 and/or the high speed shaft 50 (see FIG. 1), or any other bearing(s) within the engine. The turbine engine component 82 may still also or alternatively include one or more seals, gears, electrical devices, chamber walls, or any other type of rotating or static turbine engine component that receives lubricant for lubrication, cooling and/or heating.

Figure 5:
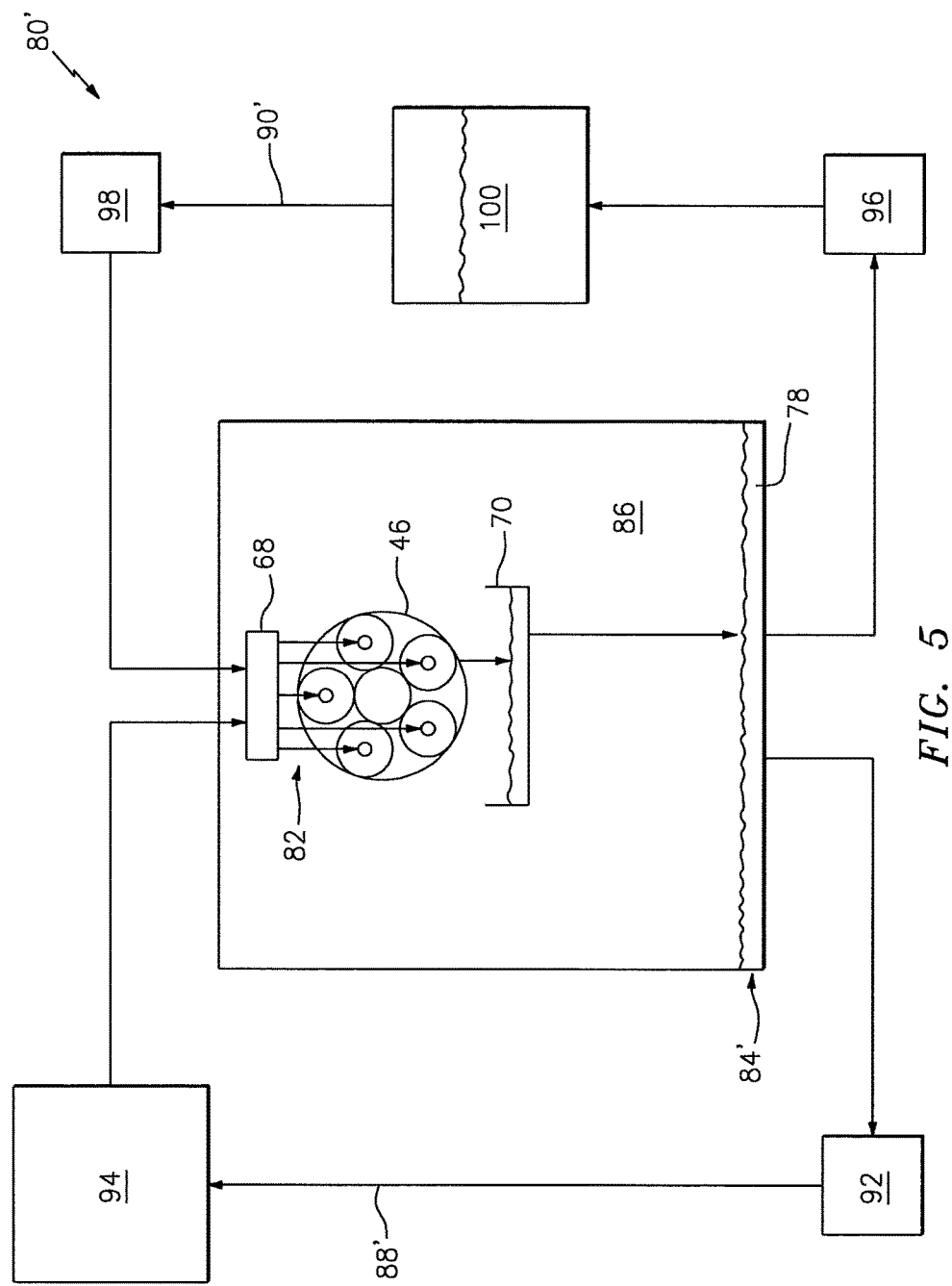
FIG. 5 is a schematic illustration of another lubrication system for the engine of FIG. 1.

The lubricant collection device 84 is configured as the gutter 70 for the gear train 46. Alternatively, the lubricant collection device 84 may be configured as the sump 78 for the engine compartment 86 as illustrated in FIG. 5, or any other type of device that temporarily collects lubricant discharged from the turbine engine component 82.

The first circuit 88 includes a lubricant pump 92 (e.g., an auxiliary pump) and a lubrication system component 94. The lubricant pump 92 may be configured as a mechanical pump that is driven by a turbine engine component such as an accessory gearbox (not shown), one of the engine rotors 40-44, or one of the shafts 48 and 50. Alternatively, the lubricant pump 92 may be configured as an electrical pump. The lubrication system component 94 may be configured as or include a heat exchanger such as a lubricant cooler and/or a lubricant heater. The lubrication system component 94 may also or alternatively be configured as or include a lubricant filtering device, a chip detector or any other type of lubricant conditioning and/or monitoring device. The lubricant pump 92 is fluidly coupled in line with and arranged upstream of the lubrication system component 94.

The second circuit 90 includes the sump 78, one or more lubricant pumps 96 and 98 (e.g., a scavenge pump and a supply pump), and a lubricant reservoir 100. One or more of the lubricant pumps 96 and 98 may each be configured as a mechanical pump that is driven by a turbine engine component such as the accessory gearbox (not shown), one of the engine rotors 40-44, or one of the shafts 48 and 50. Alternatively, one or more of the lubricant pumps 96 and 98 may each be configured as an electrical pump. The lubricant reservoir 100 may be configured as a tank (e.g., a lubrication oil tank) that holds, for example, substantially more lubricant than the collection device 84. The sump 78, the lubricant pump 96 (e.g., the scavenge pump), the lubricant reservoir 100 and the lubricant pump 98 (e.g., the supply pump) are fluidly coupled in line with one another. The sump 78 is arranged upstream of the lubricant pump 96. The lubricant pump 96 is arranged upstream of the lubricant reservoir 100. The lubricant reservoir 100 is arranged upstream of the lubricant pump 98.

The lubricant collection device 84 is fluidly coupled with and arranged downstream of the gear train 46. The first circuit 88 is configured in parallel with the second circuit 90. Each of the lubricant circuits 88 and 90, for example, extends in parallel between the lubricant collection device 84 and the lubricant manifold 68. Thus, the lubricant pump 92 is configured in parallel with the lubricant pumps 96 and 98 between the lubricant collection device 84 and the turbine engine component 82. The lubricant pump 92 and the sump 78 are each fluidly coupled with and arranged downstream of the lubricant collection device 84. The lubrication system component 94 and the lubricant pump 98 are each fluidly coupled with and arranged upstream of the lubricant manifold 68.

During lubrication system 80 operation, the lubricant collection device 84 collects lubricant discharged from the turbine engine component 82 and, more particularly, the gear train 46. The first and the second circuits 88 and 90 receive the lubricant from the lubricant collection device 84, and concurrently direct the received lubricant to the turbine engine component 82 using the lubricant pumps 92 and 98. The lubricant manifold 68 respectively receives the lubricant from the first and the second circuits 88 and 90, and directs the received lubricant to the gear train 46. In this manner, if the second circuit 90 clogs or otherwise malfunctions or becomes inoperable, the first circuit 88 may continue to provide the lubricant to the turbine engine component 82. Conversely, if the first circuit 88 clogs or otherwise malfunctions or becomes inoperable, the second circuit 90 may continue to provide the lubricant to the turbine engine component 82.

In some embodiments, some or each of the lubricant pumps 92, 96 and 98 may be configured to pump lubricant at a substantially equal flow rate. In other embodiments, some or each of the lubricant pumps 92, 96 and 98 may be configured to pump the lubricant at different flow rates. The lubricant pump 92, for example, may be configured to pump the lubricant to the turbine engine component 82 at a lower flow rate than one or more of the lubricant pump 96 and 98. Alternatively, the lubricant pump 92 may be configured to pump the lubricant to the turbine engine component 82 at a higher flow rate than one or more of the lubricant pump 96 and 98.

The lubrication system 80 and one or more components of the system 80 may have various configurations other than those described above and illustrated in the drawings. The lubrication system 80 may include, for example, a device such as a Y-fitting that receives the lubricant from the first and the second circuits 88 and 90, and directs the received lubricant to the turbine engine component 82. The first circuit 88 may be configured without the lubrication system component 94. The second circuit 90 may include a heat exchanger such as a lubricant cooler and/or a lubricant heater, a lubricant filtering device, a chip detector and/or any other type of lubricant conditioning or monitoring device. The second circuit 90 may provide lubricant to one or more other turbine engine components in addition to the turbine engine component 82, whereas the first circuit 88 may be dedicated to the turbine engine component 82. The components of the first and/or the second circuits 88 and 90 may be arranged in various orders between the lubricant collection device 84 and the turbine engine component 82. The present invention therefore is not limited to any particular lubrication system components or lubrication system configurations.

The terms "upstream", "downstream", "inner" and "outer" are used to orientate the components of the turbine engine component 82 and the lubrication system 80 described above relative to the turbine engine 20 and its axis 22. A person of skill in the art will recognize, however, one or more of these components may be utilized in other orientations than those described above. The present invention therefore is not limited to any particular component or system spatial orientations.

A person of skill in the art will recognize the lubrication system 80 may be included in various turbine engines other than the one described above. The lubrication system 80, for example, may be included in a geared turbine engine where a gear train connects one or more shafts to one or more rotors in a fan section and/or a compressor section. Alternatively, the lubrication system 80 may be included in a turbine engine configured without a gear train. The lubrication system 80 may be included in a turbine engine configured with a single spool, with two spools as illustrated in FIG. 1, or with more than two spools. The present invention therefore is not limited to any particular types or configurations of turbine engines.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined within any one of the aspects and remain within the scope of the invention. Accordingly, the present invention is not to be restricted except in light of the attached claims and their equivalents.

What is claimed is:

1. A system for a turbine engine, comprising:
a turbine engine component;
a lubricant collection device fluidly coupled with the turbine engine component;
a plurality of lubricant circuits fluidly coupled between the lubricant collection device and the turbine engine component, and including a first circuit and a second circuit configured in parallel with the first circuit;
each of the lubricant circuits including a lubricant pump;
wherein the first and the second circuits receive lubricant from the lubricant collection device and concurrently direct the received lubricant to the turbine engine component;
a plurality of turbine engine rotors arranged along an axis and including a first rotor and a second rotor, each of the engine rotors including a plurality of rotor blades arranged around and connected to a rotor disk; and
an engine compartment within which the turbine engine component is located;
wherein the turbine engine component comprises a gear train;
wherein the first rotor is connected to and driven by the second rotor through the gear train;
wherein one of the lubricant circuits further includes a sump for the engine compartment;
wherein the lubricant collection device comprises a gutter fluidly coupled between the gear train and the sump;
wherein the gutter at least partially circumscribes and collects the lubricant from the gear train; and
wherein each of the lubricant circuits extends in parallel between the gutter and the lubricant manifold.

2. The system of claim 1, wherein the first and the second circuits extend to the turbine engine component.

3. The system of claim 2, wherein
the turbine engine component includes a bearing and a manifold; and
the manifold respectively receives the lubricant from the first and the second circuits, and directs the received lubricant to the bearing.

4. The system of claim 1, wherein
the first circuit directs the received lubricant to the turbine engine component at a first flow rate; and
the second circuit directs the received lubricant to the turbine engine component at a second flow rate that is different than the first flow rate.

5. The system of claim 1, wherein one of the lubricant circuits further includes a heat exchanger.

6. The system of claim 1, wherein one of the lubricant circuits further includes a lubricant filter.

7. The system of claim 1, wherein one of the lubricant circuits further includes a lubricant reservoir.

8. The system of claim 1, wherein one of the lubricant circuits further includes a second lubricant pump.

9. The system of claim 1, wherein the turbine engine component comprises a bearing.

10. The system of claim 1, wherein the first rotor comprises a fan rotor and the second rotor comprises a turbine rotor.

11. The system of claim 1, wherein the lubricant pump included in the first circuit is an electric pump.

12. The system of claim 1, wherein the lubricant pump included in the second circuit is an electric pump.

13. The system of claim 1, wherein one of the first circuit and the second circuit bypasses the sump.

14. A system for a turbine engine, comprising:
a turbine engine component comprising a gear train;
a sump;
a lubricant collection device fluidly coupled with the turbine engine component, the lubricant collection device comprising a gutter fluidly coupled between the gear train and the sump, and the gutter at least partially circumscribing and collecting the lubricant from the gear train;
a plurality of lubricant pumps fluidly coupled between the lubricant collection device and the turbine engine component, and including a first pump and a second pump configured in parallel with the first pump;
a lubricant first circuit fluidly coupled with and extending to the turbine engine component, the first circuit including the first pump; and
a lubricant second circuit fluidly coupled with and extending to the turbine engine component, the second circuit configured in parallel with the first circuit from the gutter, and the second circuit including the second pump;
wherein the first and the second pumps receive lubricant from the lubricant collection device and concurrently direct the received lubricant to the turbine engine component.

15. The system of claim 14, further comprising:
an engine compartment within which the turbine engine component is located;
wherein the sump is configured for the engine compartment and is fluidly coupled between the lubricant collection device and the first pump.

* * * * *